United States Patent
Panidis et al.

(10) Patent No.: US 10,229,056 B1
(45) Date of Patent: Mar. 12, 2019

(54) ALIGNMENT FIXING ON A STORAGE SYSTEM DURING CONTINUOUS DATA REPLICATION TO DEDUPLICATED STORAGE

(71) Applicant: EMC IP Holding Company LLC, Hopkinton, MA (US)

(72) Inventors: Anestis Panidis, Saratoga, CA (US); Assaf Natanzon, Tel Aviv (IL); Saar Cohen, Mashav (IL)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 14/225,069

(22) Filed: Mar. 25, 2014

(51) Int. Cl.
G06F 12/06 (2006.01)
G06F 3/06 (2006.01)

(52) U.S. Cl.
CPC .............. *G06F 12/06* (2013.01); *G06F 3/061* (2013.01); *G06F 3/064* (2013.01); *G06F 2212/461* (2013.01); *G06F 2212/7201* (2013.01)

(58) Field of Classification Search
CPC .......... G06F 3/061; G06F 3/064; G06F 12/06; G06F 2212/461; G06F 2212/7201
See application file for complete search history.

(56) References Cited

U.S. PATENT DOCUMENTS

| | | | |
|---|---|---|---|
| 5,765,201 A * | 6/1998 | Manges et al. | 711/201 |
| 6,721,902 B1 | 4/2004 | Cochran | |
| 6,978,280 B1 | 12/2005 | Cochran | |
| 7,007,114 B1 | 2/2006 | White | |
| 7,007,143 B2 | 2/2006 | Cochran | |
| 7,383,465 B1 | 6/2008 | van Rietschote | |
| 7,447,854 B1 | 11/2008 | Cannon | |
| 7,549,027 B1 | 6/2009 | McAndrews | |
| 7,660,919 B2 | 2/2010 | Flynn, Jr. | |
| 7,689,633 B1 | 3/2010 | Li et al. | |
| 7,797,582 B1 | 9/2010 | Stager | |
| 7,865,677 B1 | 1/2011 | Duprey | |
| 8,271,441 B1 | 9/2012 | Natanzon | |
| 8,468,319 B1 | 6/2013 | Satran | |
| 8,532,383 B1 * | 9/2013 | Thakkar et al. | 382/173 |
| 8,566,542 B1 | 10/2013 | Wang | |
| 8,898,388 B1 | 11/2014 | Kimmel | |
| 8,909,894 B1 | 12/2014 | Singh | |
| 8,983,952 B1 | 3/2015 | Zhang et al. | |
| 9,063,838 B1 | 6/2015 | Boyle | |
| 9,116,633 B2 | 8/2015 | Sancheti | |
| 9,218,345 B1 | 12/2015 | Becker | |
| 2005/0273476 A1 | 12/2005 | Wertheimer | |
| 2007/0094467 A1 | 4/2007 | Yamasaki | |

(Continued)

OTHER PUBLICATIONS

NPL: "Q. How can I convert a thin-provisioned disk to thick, or a thick-provisioned disk to think, in ESX 4.0", WindowsITPro, Jul. 7, 2010.

(Continued)

*Primary Examiner* — Ann J Lo
*Assistant Examiner* — Masud K Khan
(74) *Attorney, Agent, or Firm* — Staniford Tomita LLP

(57) ABSTRACT

The system, process, and methods herein describe a mechanism for aligning IOs with block sizes. The alignment may occur on a storage system as part of a continuous replication process. The TO offset may be rounded down, and the size may be rounded up, so that each is a multiple of the block size.

6 Claims, 8 Drawing Sheets

(56) References Cited

U.S. PATENT DOCUMENTS

| | | |
|---|---|---|
| 2007/0100905 A1 | 5/2007 | Masters |
| 2007/0185939 A1 | 8/2007 | Prahland et al. |
| 2007/0186068 A1 | 8/2007 | Agrawal |
| 2008/0082592 A1* | 4/2008 | Ahal .................. G06F 11/2066 707/999.204 |
| 2008/0086608 A1 | 4/2008 | Kano |
| 2008/0184001 A1 | 7/2008 | Stager |
| 2009/0319534 A1 | 12/2009 | Gokhale |
| 2010/0185830 A1* | 7/2010 | Asnaashari et al. .......... 711/206 |
| 2010/0274985 A1 | 10/2010 | Yamagami |
| 2011/0138383 A1 | 6/2011 | Le |
| 2011/0161295 A1 | 6/2011 | Ngo |
| 2011/0161299 A1 | 6/2011 | Prahlad et al. |
| 2012/0136832 A1 | 5/2012 | Sadhwani |
| 2012/0198174 A1* | 8/2012 | Nellans ............... G06F 12/0804 711/133 |
| 2012/0254119 A1 | 10/2012 | Kumarasamy |
| 2012/0303923 A1 | 11/2012 | Behera |
| 2013/0060739 A1 | 3/2013 | Kalach |
| 2013/0227352 A1 | 8/2013 | Kumarasamy et al. |
| 2013/0232117 A1* | 9/2013 | Aronovich .......... G06F 11/1453 707/644 |
| 2013/0262638 A1 | 10/2013 | Kumarasamy |
| 2014/0089921 A1 | 3/2014 | Yang |
| 2014/0095816 A1 | 4/2014 | Hsu et al. |
| 2014/0337562 A1 | 11/2014 | Long |

OTHER PUBLICATIONS

NPL: Q. "What's the difference between thick-provisioned and thin provisioned disks in ESX 4.0?", WindowsITPro, Jul. 6, 2010.

* cited by examiner

US 10,229,056 B1

ALIGNMENT FIXING ON A STORAGE SYSTEM DURING CONTINUOUS DATA REPLICATION TO DEDUPLICATED STORAGE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to data backups, and more particularly to continuous data replication on deduplicated storage.

CROSS REFERENCE TO RELATED FILINGS

This application is related to co-pending U.S. patent application Ser. No. 14/227,208 filed on Mar. 27, 2014 for SYNTHESIZING VIRTUAL MACHINE DISK BACKUPS, now U.S. Pat. No. 9,389,800 issued Jul. 12, 2016, U.S. patent application Ser. No. 14/225,089 filed on Mar. 24, 2014 for RECOVERING CORRUPT VIRTUAL MACHINE DISKS, now U.S. Pat. No. 9,588,847 issued Mar. 7, 2017, and U.S. patent application Ser. No. 14/225,104 filed on Mar. 25, 2014 for ALIGNMENT FIXING ON A DATA PROTECTION SYSTEM DURING CONTINUOUS DATA REPLICATION TO DEDUPLICATED STORAGE, now U.S. Pat. No. 9,772,789 issued Sep. 26, 2017, all incorporated by reference for all purposes.

This application is related to co-pending U.S. patent application Ser. No. 14/108,002 for INITIALIZING BACKUP SNAPSHOTS ON DEDUPLICATED STORAGE, U.S. patent application Ser. No. 14/108,021 for MAINTAINING BACKUP SNAPSHOT ON DEDUPLICATED STORAGE USING CONTINUOUS REPLICATION, U.S. patent application Ser. No. 14/108,032 for POINT-IN-TIME RECOVERY ON DEDUPLICATED STORAGE, U.S. patent application Ser. No. 14/108,053 for MAINTAINING POINT-IN-TIME GRANULARITY FOR BACKUP SNAPSHOTS, U.S. patent application Ser. No. 14/108,060 for MAINTAINING BACKUP SNAPSHOTS USING CONTINUOUS REPLICATION FOR MULTIPLE SOURCES, and U.S. patent application Ser. No. 14/108,072 for RECOVERING CORRUPT STORAGE SYSTEMS, all hereby incorporated by reference for all purposes.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include backup drives for storing organizational production site data on a periodic basis. Such systems suffer from several drawbacks. First, they may require a system shutdown during backup since the data being backed up cannot be used during the backup operation. Second, they limit the points in time to which the production site can recover. For example, if data is backed up on a daily basis, there may be several hours of lost data in the event of a disaster. Third, the data recovery process itself may take a long time.

Another conventional data protection system uses data replication, by creating a copy of the organization's production site data on a secondary backup storage system, and updating the backup with changes. The backup storage system may be situated in the same physical location as the production storage system, or in a physically remote location.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
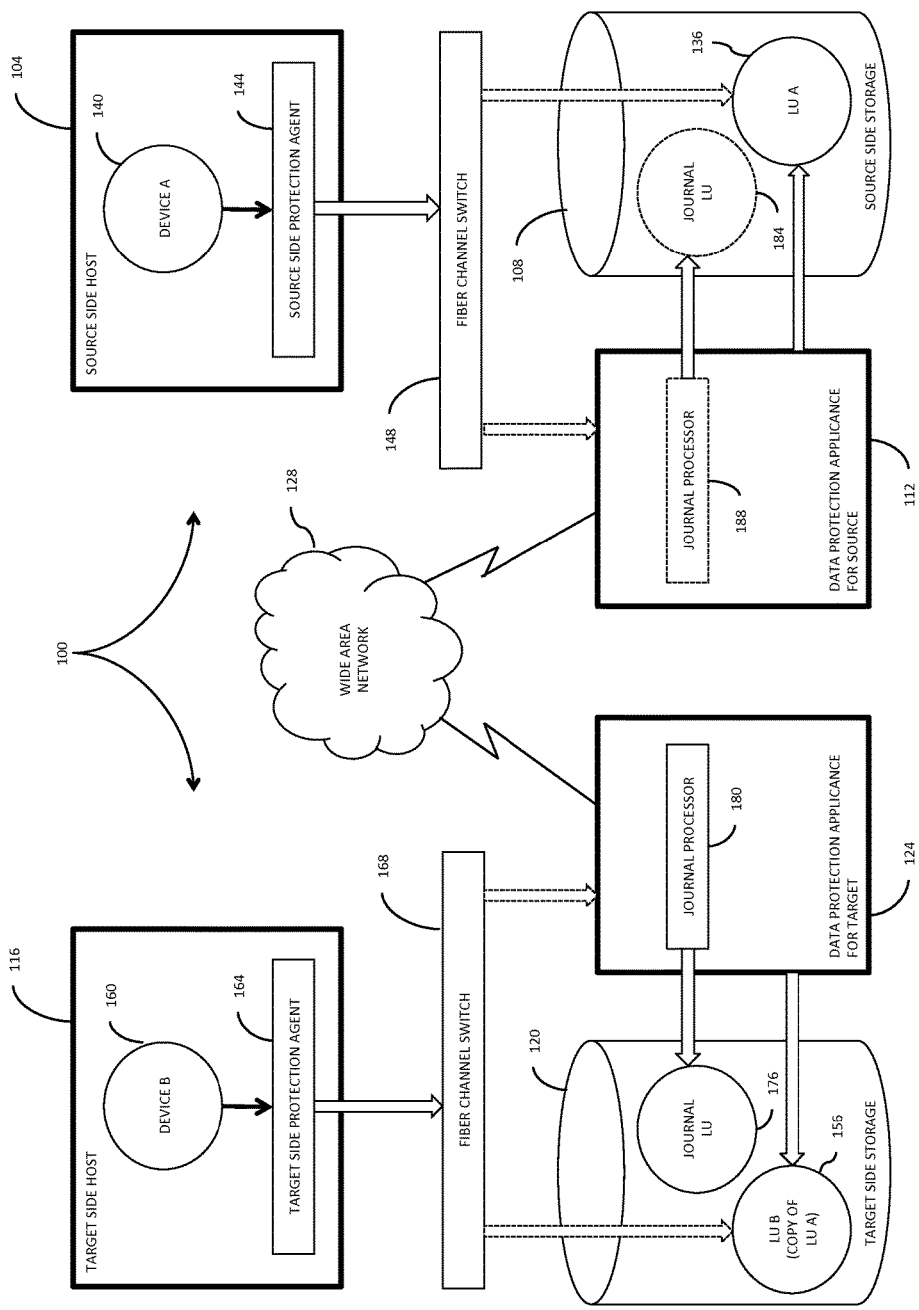
FIG. 1 is a simplified illustration of a data protection system, in accordance with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Systems, processes, and methods are discussed herein for enabling continuous data backups to deduplicated storage. In some embodiments, an initial backup snapshot of a source storage system may be created on the deduplicated storage using a data protection appliance. As changes are made to the source storage system, the IO's may be continuously communicated to the deduplicated storage for backup and protection.

In some embodiments, the deduplicated storage and/or data protection appliance may maintain journals, including data journals and metadata journals, for synthesizing new backup snapshots and/or recovering files. The journals may include DO and UNDO information compiled from IO's communicated from the data protection appliance to the deduplicated storage. These IO's may be applied to a backup snapshot to restore the snapshot to a previous point-in-time, or may be used to synthesize a new snapshot.

In an embodiment, data protection windows may be defined based on policy or user preference. The data protection windows may be used to maintain snapshots and/or journals for designated periods of time. For example, short-term windows may maintain both snapshots and journals for any point-in-time recovery (assuming the point-in-time falls within the short-term window). Mid-term windows, in contrast, may delete journals but maintain all the snapshots created during a period, and long-term windows may delete all the journals and select snapshots. Defining different protection windows may allow point-in-time recovery for files accessed recently, while also providing reduced storage consumption for long-term backups.

The systems discussed herein may additionally allow backup snapshots to be synthesized on deduplicated storage from IO's provided from multiple data protection appliance. For example, two data protection appliances may protect a single storage area network ("SAN"). Each of those data protection agents may report IO's to the deduplicated storage, and a single backup snapshot may be synthesized from the journals maintaining those IO's.

The following non-limiting definitions may be helpful in understanding the specification and claims:

BACKUP SITE—may be a facility where replicated production site data is stored; the backup site may be located in a remote site or at the same location as the production site; a backup site may be a virtual or physical site.

CDP—Continuous Data Protection, may refer to a full replica of a volume or a set of volumes along with a journal which allows any point in time access, the CDP copy is at the same site, and maybe the same storage array of the production site.

DATA PROTECTION APPLIANCE ("DPA")—may be a computer or a cluster of computers, or a set of processes that serve as a data protection appliance, responsible for data protection services including inter alia data replication of a storage system, and journaling of I/O requests issued by a host computer to the storage system. The DPA may be a physical device, a virtual device running, or may be a combination of a virtual and physical device.

HOST—may be at least one computer or networks of computers that runs at least one data processing application that issues I/O requests to one or more storage systems; a host is an initiator with a SAN; a host may be a virtual machine.

HOST DEVICE—may be an internal interface in a host to a logical storage unit.

IMAGE—may be a copy of a logical storage unit at a specific point-in-time.

INITIATOR—may be a node in a SAN that issues I/O requests.

I/O—may mean a input, output, read, read request, write, write request, or any combination thereof.

JOURNAL—may be a record of write transactions issued to a storage system. A journal may be used to maintain a duplicate storage system, and to rollback the duplicate storage system to a previous point-in-time.

LOGICAL UNIT—may be a logical entity provided by a storage system for accessing data from the storage system.

LUN—may be a logical unit number for identifying a logical unit. May also refer to one or more virtual disks or virtual LUNs, which may correspond to one or more Virtual Machines. As used herein, LUN and LU may be used interchangeably to refer to a LU.

PHYSICAL STORAGE UNIT—may be a physical entity, such as a disk or an array of disks, for storing data in storage locations that can be accessed by address.

PRODUCTION SITE—may be a facility where one or more host computers run data processing applications that write data to a storage system and read data from the storage system; may be a virtual or physical site.

RPA—may be replication protection appliance, and is another name for DPA. An RPA may be a virtual DPA or a physical DPA.

SAN—may be a storage area network ("SAN") of nodes that send and receive I/O and other requests, each node in the network being an initiator or a target, or both an initiator and a target.

SOURCE SIDE—may be a transmitter of data within a data replication workflow. During normal operation a production site is the source side, and during data recovery a backup site is the source side. Source side may be a virtual or physical site.

SNAPSHOT—a snapshot may refer to an image or differential representations of an image, i.e. the snapshot may have pointers to the original volume, and may point to log volumes for changed locations. Snapshots may be combined into a snapshot array, which may represent different images over a time period.

SPLITTER/PROTECTION AGENT—may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

STORAGE SYSTEM—may be a SAN entity that provides multiple logical units for access by multiple SAN initiators.

STREAMING—may mean transmitting data in real time, from a source to a destination, as the data is read or created.

SYNTHESIZE—may mean creating a new file using pointers from existing files, without actually copying the referenced data. For example, a new file representing a volume at a points-in-time may be created using pointers to a file representing a previous point-in-time, as well pointers to journal representing changes to the volume TARGET—may be a node in a SAN that replies to I/O requests.

TARGET SIDE—may be a receiver of data within a data replication workflow; during normal operation a back site is the target side, and during data recovery a production site is the target side; may be a virtual or physical site.

VIRTUAL VOLUME—may be a volume which is exposed to host by a virtualization layer, the virtual volume may be spanned across more than one site and or volumes.

VIRTUAL RPA (vRPA)/VIRTUAL DPA (vDPA)—may be an DPA running in a VM.

WAN—may be a wide area network that connects local networks and enables them to communicate with one another, such as the Internet.

Overview of a Backup System Using a Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system. Additionally or alternatively, the protection agent may be installed as part of the storage array IO stack. In some embodiments the DPA may be installed as a virtual appliance or as a set of processes inside the storage array.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
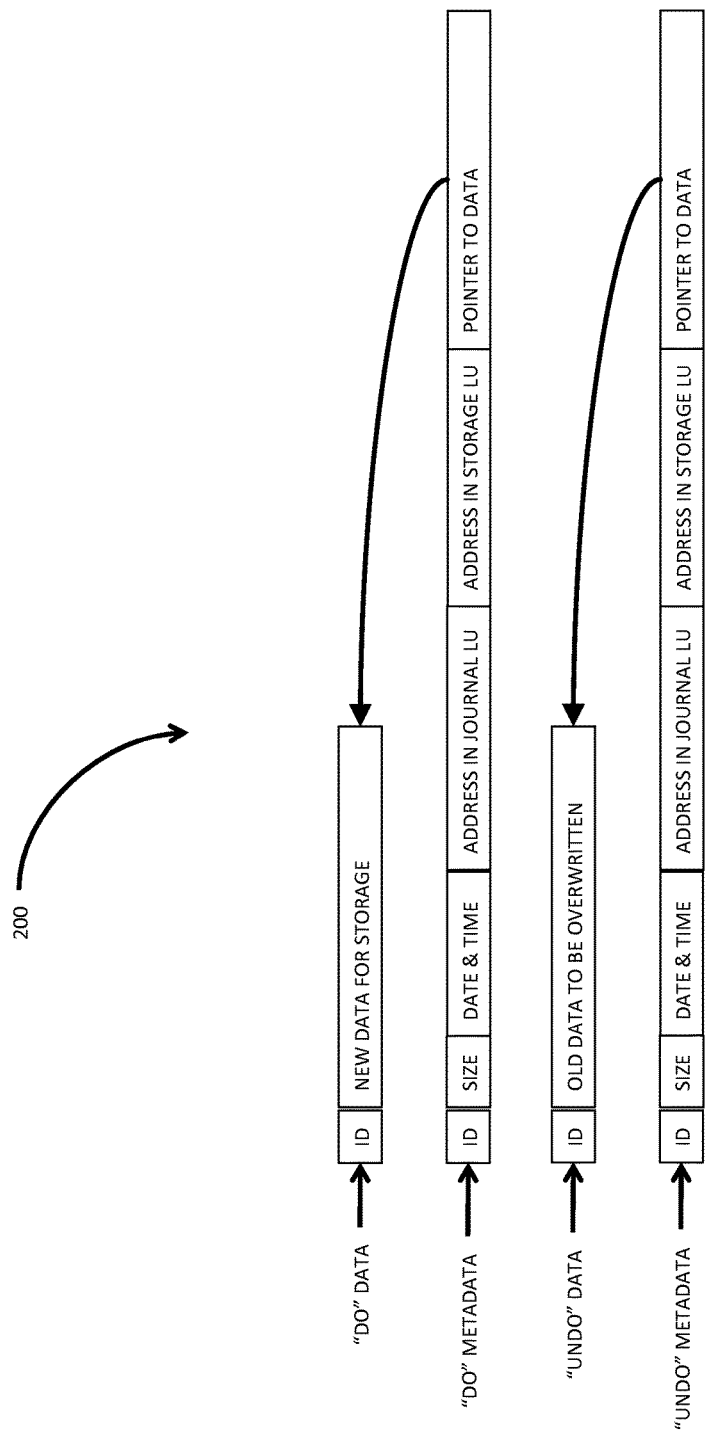
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention.

The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
   one or more identifiers;
   a time stamp, which is the date & time at which the transaction was received by source side DPA 112;
   a write size, which is the size of the data block;
   a location in journal LU 176 where the data is entered;
   a location in LU B where the data is to be written; and
   the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated.

Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Initializing a Backup Snapshot on Deduplicated Storage

Figure 3:
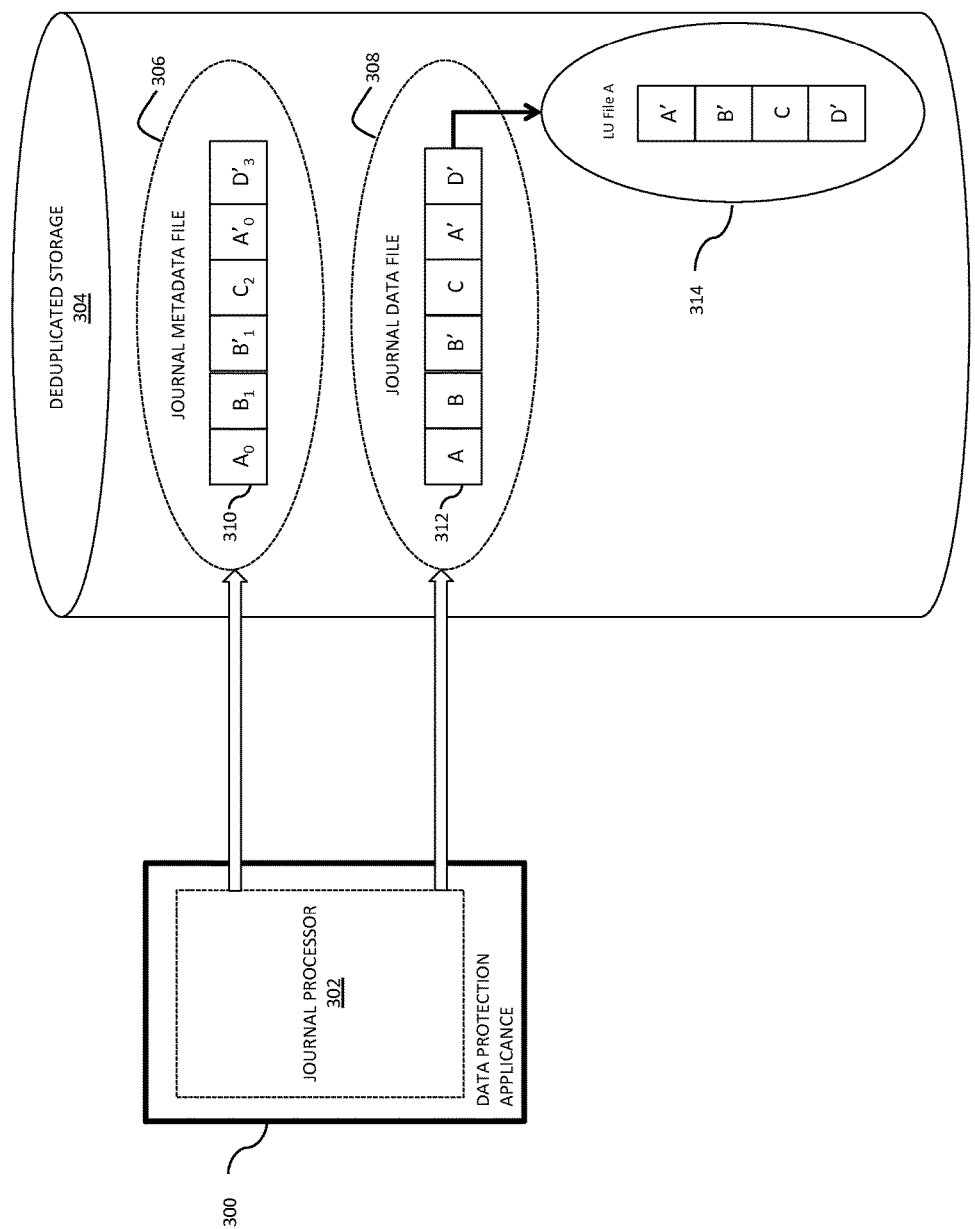
FIG. 3 is a system for initializing a backup snapshot, consistent with an embodiment of the present disclosure.
Figure 4:
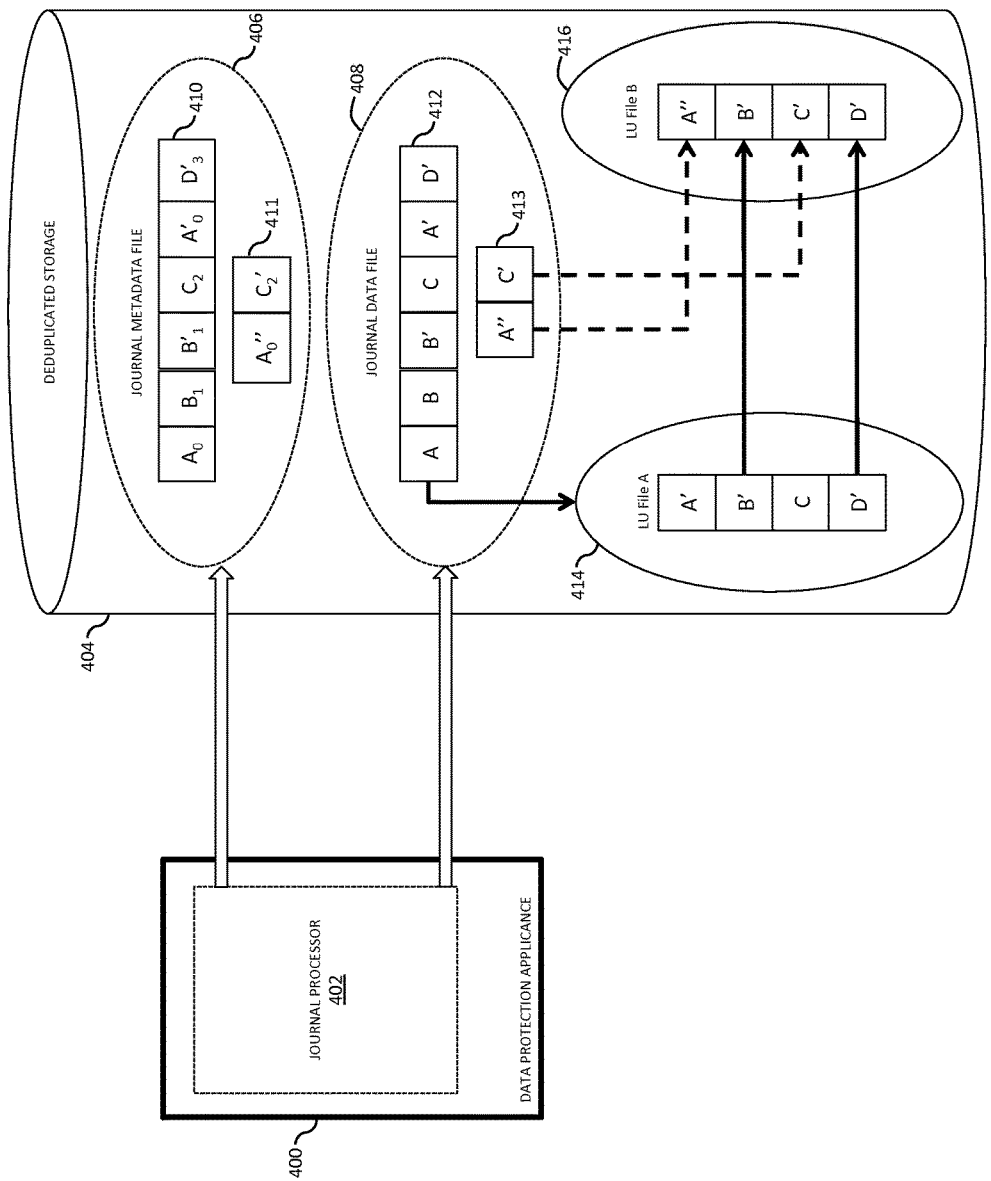
FIG. 4 is a system for synthesizing new backup snapshots, consistent with an embodiment of the present disclosure.
Figure 5:
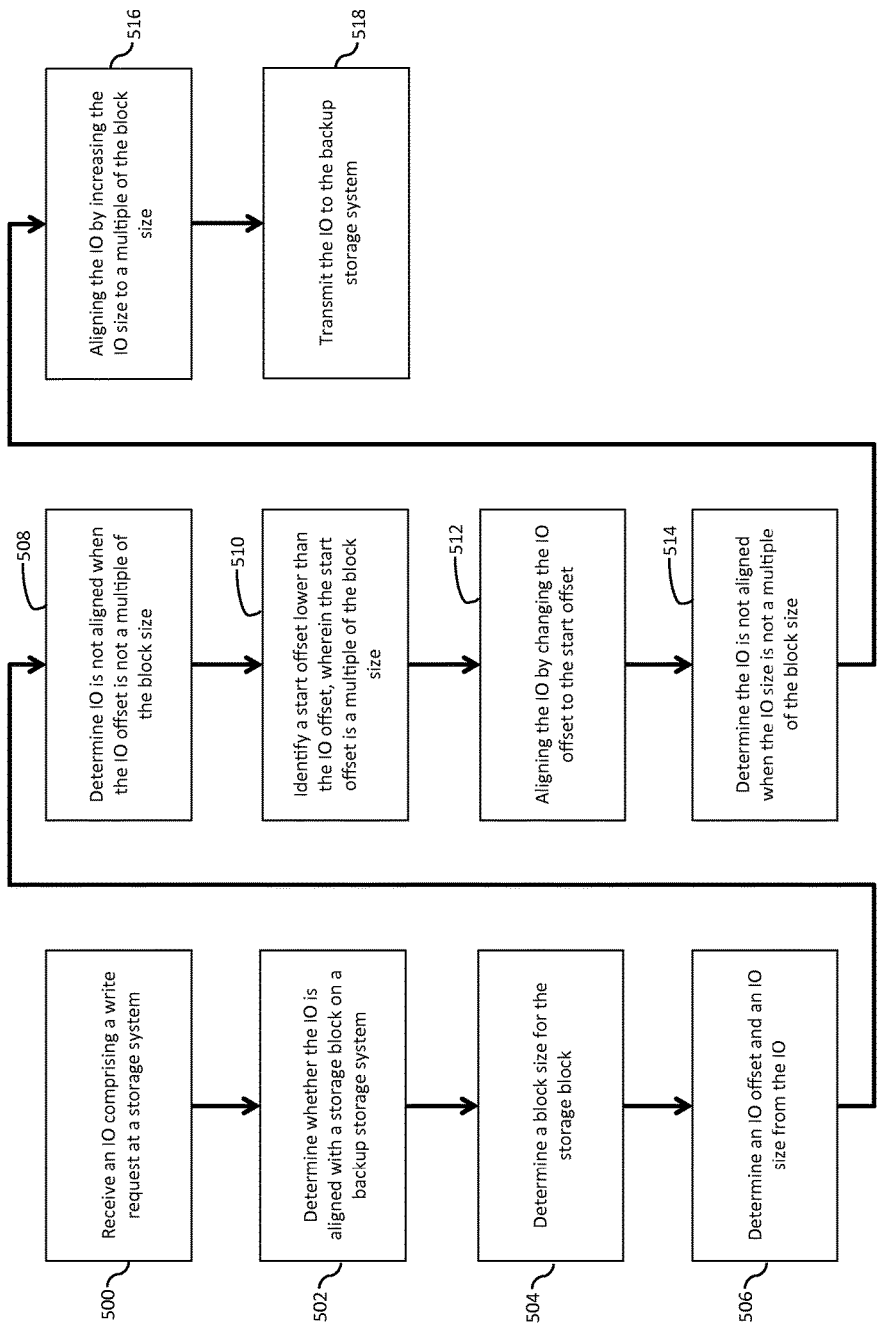
FIG. 5 depicts a process for byte alignment on a storage devices consistent with an embodiment on the present disclosure.

FIG. 3, FIG. 4, and FIG. 5 depict systems and processes for initializing a backup snapshot on deduplicated storage consistent with an embodiment of the present disclosure. Before deduplicated storage can provide continuous backup protection, it may be necessary to create an initial backup snapshot of the source storage system. This initial backup snapshot may represent the earliest point-in-time backup that may be restored. As changes are made to the source storage system, journal files and/or new backups may be updated and/or synthesized to provide continuous protection. In some embodiments, the initial backup snapshot may be created by streaming IO's from a storage system scan to a data protection appliance, or by taking an initial snapshot of the storage system and transmitting the entire snapshot to deduplicated storage.

FIG. 3 depicts a system for creating an initial backup snapshot by scanning a source storage system and streaming IO's to the deduplicated storage. Data protection application 300 may comprise journal processor 302, and may be in communication with deduplicated storage 304. In an embodiment, deduplicated storage 304 may be target side storage residing at a backup site. Data protection appliance 300 may be similar to data protection appliance 112 and/or 124, and may be responsible for streaming IO's to deduplicated storage 304.

In an embodiment, a source storage system may be scanned and individual offsets may be streamed to data protection appliance 300. The offsets streamed from the scanned system may be referred to as initialization IO's, and may be streamed sequentially to data protection appliance 300. For example, the scanned system may comprise offsets 0, 1, 2, and 3, comprising data A, B, C, and D. The initial scan may start at the beginning of the system, and transmit offset 0, followed by offset 1, et seq.

As data protection appliance 300 receives the initialization IO's, journal processor 302 may identify the offset data and metadata, and may stream the IO's to metadata journal 306 and/or data journal 308 residing on deduplicated storage 304. Data journal 308 may comprise data stored within an offset, and metadata 306 may include metadata associated with that offset. Metadata could include, for example, an offset identifier, size, write time, and device ID. These journals may then be used to synthesize a backup snapshot on deduplicated storage 304, as discussed below.

In some embodiments, a scanned storage system may operate in a live environment. As a result, applications may be writing to the storage concurrently with the scan process. If an application writes to a location that has already been streamed, the journal files and ultimately the synthesized snapshot may be out of date. To address this issue, application IO's may be streamed concurrently with the initialization IO's if the application IO's are to an offset that has already been scanned. For example, consider Table 1:

| Offset/Time | t0 | t1 | t2 | t3 |
| --- | --- | --- | --- | --- |
| 0 | A | | | A' |
| 1 | B | B' | | |
| 2 | C | | | |
| 3 | D | | D' | |

Table 1 depicts four different offsets, denoted as 0, 1, 2, and 3, and four times, t0, t1, t2, and t3. Letters A, B, C, and D may represent the data stored at the offsets. Time t0 may represent the offsets as they exist when the scan begins. These offsets may be streamed to data protection appliance 300 sequentially from 0 to 3. At time t1, however, the data at offset 1 is modified by an application from B to B'. Similarly, at t2 the data at offset 3 changes from D to D', and at t3 the data at offset 0 changes from A to A'. If the scan transmits the data at offset 1 before t1, B' may be missed since the change occurred after offset 1 was scanned and B was transmitted. Similarly, if the scan has not reached offset 3 before t2, only D' will be transmitted since D no longer exists. It may therefore be beneficial to transmit application IO's to data protection appliance 300 if those IO's write to an offset that has already been scanned. If the offset has not been scanned, it may not be necessary to transmit the application IO's because the change will be transmitted when the scan reaches that offset.

Turning back to FIG. 3 and with continued reference to Table 1, offset metadata journal entries 310 and offset data journal entries 312 depict the state of metadata journal 306 and data journal 308 after the initial scan is complete. While there are only four offsets on the scanned storage system, there are six entries in the journal because the data in offset 0 and 1 was modified by an application after they were scanned. They each therefore have two entries: B and B'. Segment D was modified after the scan began, but before it was reached. Segment D therefore only has one entry: D'.

Metadata journal entries 310 and data journal entries 312 may include all of the data necessary to synthesize a backup snapshot of the scanned storage system. Data journal entries 312 may contain the actual data from the storage system: A, B, B' C, A' and D'. Note that data D is not in the data journal 308 since it was modified on the storage system before its offset was scanned and transmitted. Metadata journal entries 310 may include metadata about the offsets. For example, metadata journal entries 310 may include an offset identifier, offset length, and write time, and volume/device ID. In the present example, metadata journal entries may include the entries shown in Table 2:

0. Vol A, offset=0; size=8 kb; time=t0
1. Vol A, offset=8 kb; size=8 kb; time=t0
2. Vol A, offset=8 kb; size=8 kb; time=t1
3. Vol A, offset=16 kb; size=8 kb; time=t0
4. Vol A, offset=0; size=8 kb; time=t3
5. Vol A, offset=24 kb; size=8 kb; time=t2

Table 2's metadata entries may correspond to the states shown in Table 1. The offset at location 0 may be offset 0, the offset at 8 kb may be offset 1, the offset at 16 kb may be offset 2, and the offset at 24 kb may be offset 3. The subscript of each journal entries 310 also identifies the offset associated with that metadata entry.

Deduplicated storage may use metadata journal 306 and data journal 308 to synthesize initial backup snapshot 314. First, metadata journal 306 may be queried to identify the most recent data associated with each offset. Next, the data may be retrieved from journal data file 308 and synthesized into backup snapshot 314. In some embodiments, synthesizing the backup snapshot may comprise creating and/or copying pointers rather than copying entire data blocks. This could be, for example, using a product such as EMC® DataDomain® Boost™

For example, once the initial scan is complete, data journal 308 includes data A, B, B', C, A', and D'. A' and B' are the result of application IO's occurring during the scan process, and therefore represent the present state of offsets 0 and 1. To create backup snapshot 314, deduplicated storage may therefore retrieve A', B', C, and D' from the data journal 308 and synthesize them together.

Once initial backup snapshot 314 is synthesized, journal entries 310 and 312 may no longer be needed. In an embodiment, they may be removed from deduplicated storage 304 in order to conserve space. Alternatively, they may remain in the journals.

The systems and processes discussed in reference to FIG. 3 enable a system to create an initial backup snapshot. Once the initial snapshot is created, additional processes may enable continuous data protection and point-in-time recovery. These processes will now be discussed.

Maintaining Backup Snapshots with Continuous Data Replication

With reference now to FIG. 4, a system and process for maintaining backups using continuous data replication is discussed. As datasets increase in size, backing them up to remote or local backup devices becomes increasingly costly and complex. Additionally, traditional backup processes may not allow point-in-time recovery since the backups occur on a periodic, rather than continuous, basis. The methods and systems discussed herein provide continuous backup protection as writes are made to a source device, thereby reducing backup cost and complexity, and may allowing point-in-time recovery for backed up files.

Figure 6:
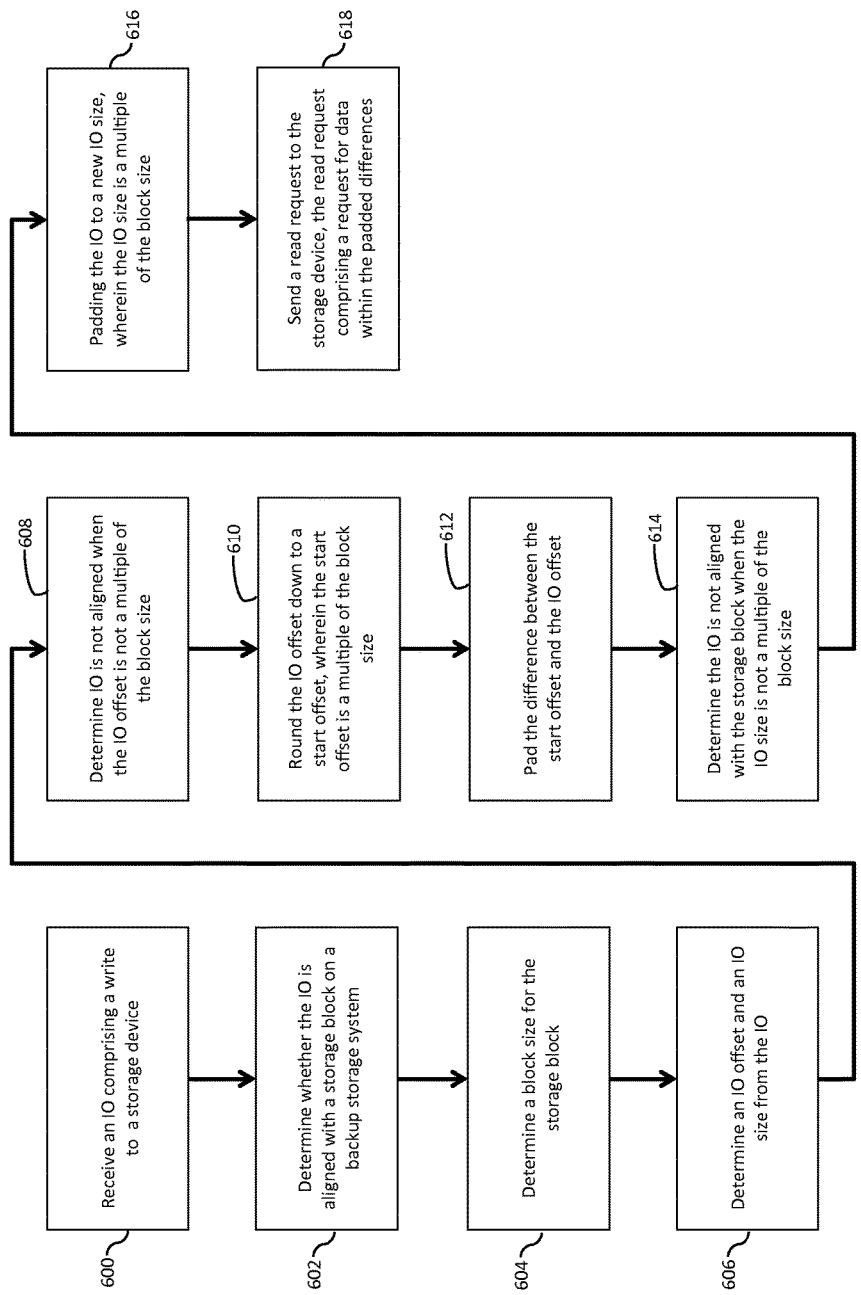
FIG. 6 depicts a process for asynchronously aligning IOs consistent with an embodiment of the present disclosure.

The system of FIG. 6 includes data protection appliance 400, journal processor 402, and deduplicated storage 404. These elements may be substantially similar to those discussed in reference to FIG. 3. Deduplicated storage 404 may include backup snapshot 414, metadata journal file 406, and data journal file 408. In an embodiment, backup snapshot file 414 is synthesized in a manner substantially similar to backup snapshot 314, and may be created using metadata journal entries 410 and data journal entries 412.

As users, applications, and other processes access and use the source storage system, data on that system may change and/or new data may be created. As a result, initial backup snapshot 414 may become stale. If the source storage system should fail, there is a chance that any new or modified data may be lost. To address this concern, data protection appliance 400 may receive and stream application IO's to deduplicated storage system 404 on a continuous basis, even after initial backup snapshot 414 is synthesized. Streaming the application IO's allows the backups on deduplicated storage 404 to remain up-to-date, without needing to perform additional backups of large datasets. This may reduce network traffic, reduce workloads, and conserve space on deduplicated storage 404.

For example, new metadata entries 411 and new data journal entries 413 represent IO's made after initial backup snapshot 414 was synthesized. These entries may be written to metadata journal 406 and data journal 408, as shown in FIG. 4, or they may be written to separate journal files. In FIG. 4, data A' and C were modified on the source storage device, and the journal entries therefore comprise A" and C'.

Periodically, new backup snapshots may be synthesized from a previous backup snapshot and new journal entries. For example, second backup snapshot 416 may be synthesized from initial backup snapshot 414, new metadata journal entries 411, and new data journal entries 413. Second backup snapshot 416 may be used to restore source storage system up to the point-in-time the last journal entry was received. In other words, backup snapshot 416 represents a backup of the source storage system at a later timestamp than initial backup snapshot 414.

In an embodiment, synthesizing second backup journal entry 416 may be substantially similar to synthesizing the initial backup snapshot 414. Rather than synthesizing all of the data from data journal 408, however, unchanged data may be synthesized from initial backup snapshot 414. In an embodiment, this synthesis may comprise copying and/or creating a data pointer. For example, in FIG. 4 the solid arrows between initial backup snapshot 414 and second backup snapshot 416 represent unchanged data that is common between the two. In this case, only B' and D' remain unchanged. The dashed arrows represent new or changed data that needs to be synthesized into second backup snapshot 416. In FIG. 4, A' is changed to A", C is change to C'. Synthesizing the data into second backup snapshot 616 therefore results in A", B', C', D'.

Additionally or alternatively, second backup snapshot 416 may be synthesized entirely from journal entries. Rather than synthesizing unchanged data from initial backup 414, deduplicated storage 404 may retrieve the unchanged data from data journal entries 412. For example, B' and D' may be synthesized from data journal entries 412 rather than from initial backup snapshot 414.

Additional backup snapshots, such as second backup snapshot 416, may be created periodically or on demand. For example, a user policy may specify that new snapshots should be created every week. Additionally or alternatively, a user may be preparing to perform some risky operations on the source storage system, and may demand that a snapshot be created in case something goes wrong. These policies may be maintained and applied using data protection appliance 400, deduplicated storage 404, and/or an external system.

The system and processes discussed herein may enable additional backup snapshots to be synthesized from journal entries and existing snapshots. In some embodiments, the journal entries may be application IO's which are continuously streamed to a data protection appliance. While these snapshots may provide additional data protection, they may only allow data that exists in the snapshots to be recovered. Combining snapshots and journal files may, however, allow any point-in-time recovery.

Alignment Fixing for Continuous Replication into Deduplicated Storage

As discussed in the preceding paragraphs and related applications, continuously streaming IO's to a data protection system may provide numerous performance and/or data protection benefits. These IO's may be used to synthesize backup snapshots on the deduplicated storage, which may then be used for data recovery. The performance benefits may be lessened, however, if the IO's are not properly aligned with the blocks on the deduplicated storage. Unaligned IO's may cause data moves during the synthesis process rather than mere pointer manipulation. Further, if IO's are unaligned early in a journal file they may have a cascading effect on subsequent IO's. The systems and processes discussed herein allow a system to align IO's with the deduplicated block sizes.

Synthesis processes, as discussed at least in reference to FIG. 4, allow backup snapshots to be created with little or no data movement. Reducing data movement is desirable as it may decrease the likelihood of duplication, thereby conserving space, and reduce processing time. Rather than moving data, synthesis processes attempt to create pointers to the data as it exists within other files on the system. If a pointer can not be created for the data, the data must be read from the location where it already exists and written to the new file being synthesized. This results in two IO operations, a read and a write, which would otherwise be unnecessary.

Unaligned IO's increase the probability of data movement during the synthesis process. Pointers must themselves be aligned, which means they can only point to an offset which is a multiple of a data block size, where the data length is also a multiple of the block size. They cannot, for example, point to a location in the middle of the data block. Therefore, if an IO has an offset and/or a data length that is not aligned (i.e. a multiple of) a data block size, the synthesis process cannot create a pointer for that IO and a data move may be necessary.

For example, a deduplicated storage system may have a basic block size of 8 kb. Pointers may therefor be created for any data with an offset and length that is a multiple of 8 kb (e.g offset 24 kb; length 64 kb). Suppose an IO arrives, however, which has a length of 2 kb. No matter where this IO is written, a pointer cannot be used because the IO length is not a multiple of a block size. As a result, a synthesis process involving that IO would need to read and write the 2 kb of data, resulting in two IO operations rather than mere pointer manipulation.

Similarly, if an IO arrives with an offset of 2 kb and a length of 8 kb, the synthesis process cannot use pointer manipulation since the offset is not a multiple of the block size. As a result, the 8 kb must be read and written to a new location during the synthesis process.

Finally, suppose an IO arrives with an offset of 2 kb and a size of 24 kb. This IO may span four separate data blocks. The first 6 kb of the IO would need to be read/written during the synthesis process since it starts at 2 kb and has a length of 6 kb, neither of which is a multiple of the 8 kb block size. Similarly, the last 2 kb would need to be read/written since 2 kb is not a multiple of the block size. The middle 16 kb, however, may be synthesized using pointer manipulation. This portion of the IO may start at offset 8 kb (since the first portion started at 2 kb and has a length of 6 kb), and has a total length of 16 kb. Both the offset and the length are multiple of the block size, and therefore do not need to be read or written. As a result, synthesizing a file using this IO would involve both pointer manipulation and IO operations.

Since IO's are journaled sequentially, the misalignment of a single IO may have a cascading effect on the rest of the journal. A misaligned IO at the start of a journal file may impact all the subsequent IO's in the journal, even if they would otherwise be aligned. Suppose, for example, the following IO's arrive at a data protection appliance:
  0. offset=8 kb; size=16 kb
  1. offset=2 kb; size=2 kb
  2. offset=24 kb; size=64 kb Further suppose these offsets are sequentially journaled in a data journal on deduplicated storage as follows:
  0. offset=0 kb; size=16 kb
  1. offset=16 kb; size=2 kb
  2. offset=18 kb; size=64 kb Note that offsets in the data journal are those for the deduplicated storage. The offsets that arrived from the primary storage system (i.e. 8 kb, 2 kb, and 24 kb) are stored in the metadata journal.

In the above example, the only IO that is properly aligned in the journal is the one at offset 0 kb (still assuming a block size of 8 kb). The IO at offset 16 kb is not properly aligned since its length is only 2 kb. Further, the IO at offset 16 kb misaligns the next IO, which starts at offset 18 kb. As a result, any synthesis operations involving these three IOs will require data movement.

Figure 7:
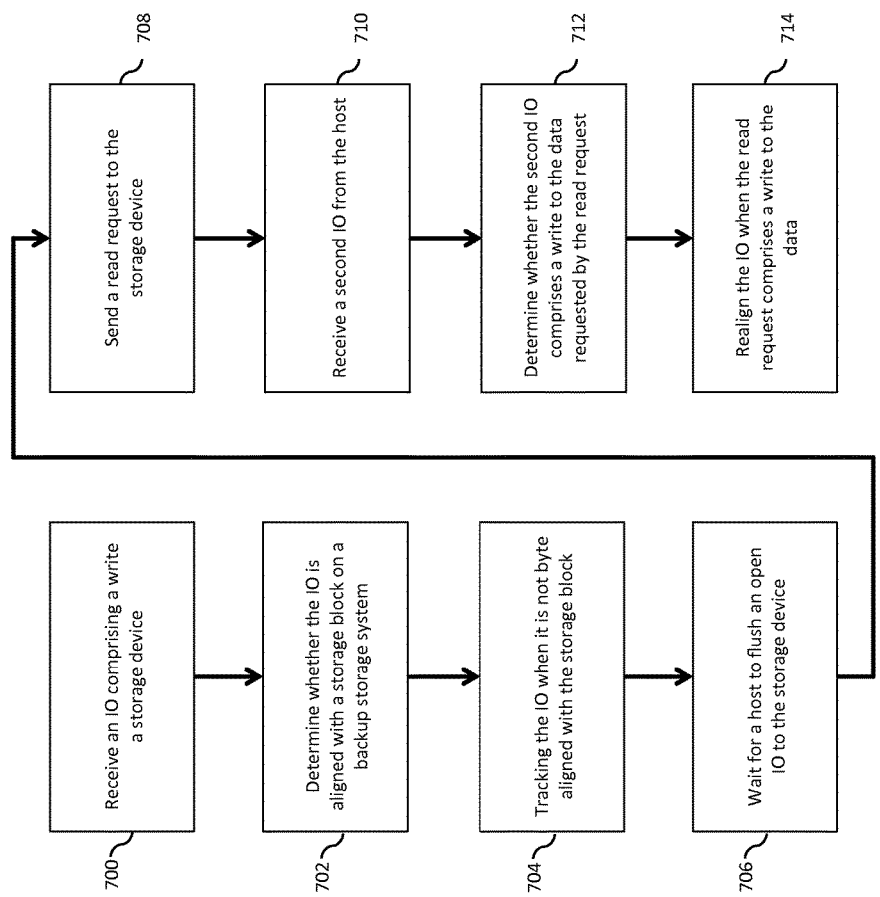
FIG. 7 depicts a method for identifying dirty IOs consistent with an embodiment of the present disclosure.
Figure 8:
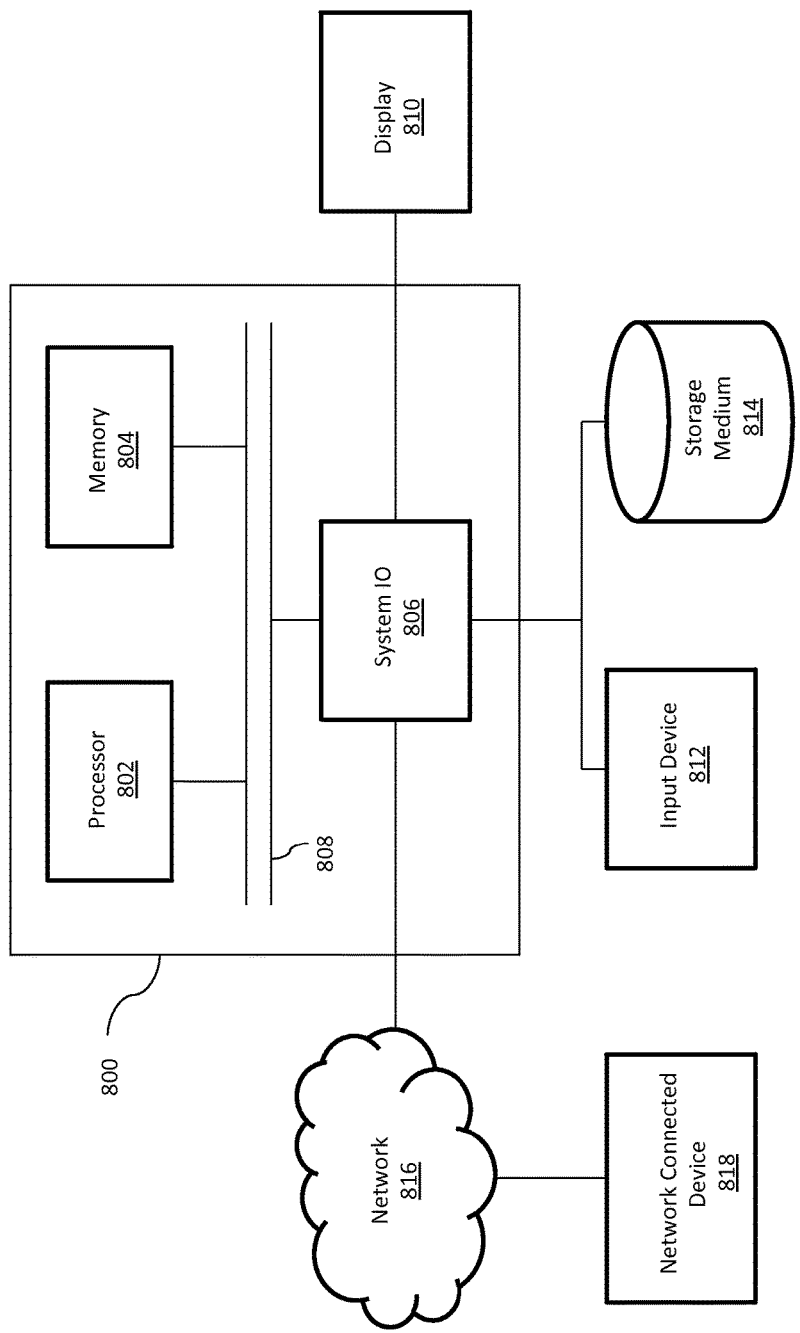
FIG. 8 depicts a general purpose computer system, consistent with an embodiment of the present disclosure.

With this understanding, FIG. 5, FIG. 6, and FIG. 7 depict processes for aligning the IOs on the deduplicated storage. The alignment process may occur at one of multiple locations, or it may be spread across several locations. In one embodiment, the IOs may be aligned before they are transmitted to the data protection appliance. Additionally or alternatively, the may be aligned after they arrived. The following discussion addresses several of these embodiments.

FIG. 5 depicts a process for aligning the IOs prior to transmitting them to a data protection appliance and/or deduplicated storage device. At block 500, an IO comprising a write request may be received by a storage system. In some embodiments, this storage system may be a SAN and the IO may be received from a host device. Additionally or alternatively, the storage system may be internal storage on a host device, such as a hard drive.

At block 502, a determination is made whether the IO is aligned with a storage block on a backup storage system. This determination may be made, for example, by the storage system. In some embodiments, the backup storage system may be a deduplicated storage, a data protection appliance, or a combination of both. The next few blocks discuss how the alignment determination is made.

At 504, a block size for the storage block is determined. The storage system may already know this block size, or it may request the block size from the backup storage system. For example, the block size may be 8 kb as discussed above. It should be appreciated that while 8 kb is used as an example, any block size is consistent with any embodiments discussed in this disclosure. For example, the block size could be 2 kb, 4 kb, 8 kb, 16 kb, or any other number.

At block 506, an IO offset and an IO size may be determined from the IO. For example, the IO offset may be 2 kb and the IO size may be 2 kb. This means the IO is requesting to write 2 kb of data, starting at offset 2 kb. In an embodiment, the write has already been made to the system and the IO is being processed prior to transmission to the backup storage system.

At block 508, a check is made to determine whether the IO offset is a multiple of the block size. If the offset is not a multiple of the block size, the IO is not properly aligned (as discussed above).

At block 510, the system attempts to fix the alignment issue. Specifically, the IO offset is changed so that it is a multiple of the block size. A start offset which is a multiple of the block size is identified. This start offset may be an offset lower than the IO offset, and in an embodiment is the nearest lower offset that is a multiple of the block size. For example, if the IO offset is 2 kb and the data block size is 8 kb, the start offset may be 0 kb. Similarly, if the IO offset is 26 kb and the data block size is 8 kb, the start offset may be 24 kb (or any other lower offset that is a multiple of 8 kb).

At 512, the IO is aligned by changing the IO offset to be the start IO. This process may involve not only changing the offset, but also reading the data between the new offset and the original IO offset and adding it to the IO. For example, if the IO was to offset 2 kb with a length of 2 kb, and the IO offset is changed to 0 kb, the data between 0 kb and 2 kb may be read and added to the IO. The IO now has an offset of 0 kb and a length of 4 kb. The data includes the original 2 kb to be written to the storage system, and an additional 2 kb read from the storage system.

At block 514, a check is made to determine whether the IO size is a multiple of the block size. If it is not, the IO is not properly aligned. Continuing with the example above, an IO may have an offset of 0 kb and a length of 4 kb. While the offset is proper, the length is still not a multiple of the block size. If this IO were transmitted to the backup storage system it may end up in a data journal file and any subsequent IOs would be misaligned (since they would start at offset 4 kb, which is not a multiple of 8 kb).

Note that in this embodiment the IO size is checked after the offset is aligned. In other words, the IO size is 4 kb, not 2 kb as originally received. This is because an IO size may be a multiple of the block size when the IO arrives, but the size may change after the offset is changed. Consider an original received IO with an offset of 2 kb and a size of 16 kb. 16 kb is a multiple of a the block size. When the offset is changed to 0 kb, however, the IO size increases to 18 kb, which is not a multiple of the block size. If this IO were transmitted to the storage system, the IO would still not be properly aligned since the first block would contain 8 kb and the second block would only contain 2 kb.

At block 516, the IO is further aligned by increasing its size to a multiple of the block size. For example, the IO size may be increase from 4 kb to 8 kb. The data between 4 kb and 8 kb may be read from the storage system and added to the IO.

In our example, the original IO with an offset of 2 kb and a length of 2 kb now has an offset of 0 kb with a length of 8 kb. It is therefore properly aligned with the data block. Additionally, the first 2 kb and the last 4 kb may comprise data read from the storage system, while the second 2 kb may comprise the data to be written to the storage system.

In some embodiments, reads associated with alignment blocks 512 and 516 may be performed at the same time. In other words, the alignment may only require a single read from the storage.

Finally, at block 518 the aligned IO may be transmitted to the backup storage system for protection. For example, the IO may be transmitted to a data protection appliance and/or the deduplicated storage. Once the system receives the TO, no further processing may be necessary since it is properly aligned.

While the process above discusses modifying both the IO offset and the IO size to align the IO, it may not be necessary to perform one or both of these operations. For example, if the IO offset and IO size are both multiples of the block size when the IO arrives, the IO is already aligned and no further operations may be necessary. Further, if the IO offset is a multiple of the block size, but the IO size is not, only the IO size may need to be modified.

Turning now to FIG. 6, a process is shown for aligning IOs after they arrive at a data protected system. For example, this alignment process may occur at a data protection appliance, such as data protection appliance 400, or a deduplicated storage, such as deduplicated storage 404.

At block 600, an IO may be received. This IO may comprise a write to a storage system, and in an embodiment may be received at a data protection appliance. In some embodiments, the IO may be received as part of a continuous data protection process as discussed above and in the cross referenced applications.

At 602, a determination is made whether the IO is aligned with a storage system block in a backup storage system. The backup storage system could be, for example, a deduplicated storage system. At least some of the following blocks discuss how this determination is made.

At block 604, a block size is determined. For example, a data protection appliance may query the backup storage system for the appropriate block size. Alternatively, the data protection appliance may already know the appropriate block size. As noted above, this block size could be, for example, 8 kb—though any other block size is consistent with this disclosure.

At block 606, an IO offset and an IO size may be determined from the IO. The IO could have, for example, and IO offset of 2 kb and a size of 2 kb. In other words, the IO wishes write 2 kb to the storage device, starting at offset 2 kb.

At 608, a check is made to determine whether the IO offset is a multiple of the block size. If the offset is not a multiple of the block size, the IO is not aligned. This is substantially similar to the examples given above.

At block 610, the IO offset is rounded down to a start offset when the IO offset is not a multiple of the block size. For example, if the offset is 2 kb and the data block size is 8 kb, the IO offset may be rounded down to a multiple of the block size. In this instance, the new offset would be 0 kb. The new offset may be any offset that is a multiple of the block size and is less than the IO offset, and in some embodiments is the nearest offset that meets those criteria. However, the nearest offset does not necessarily need to be used. For example, if the IO offset is 26 kb, it may be rounded down to a start offset of 0 kb, 8 kb, 16 kb, or 24 kb.

At 612, the difference between the start offset and the original IO offset is padded. For example, if the IO offset was 2 kb and the start offset is 0 kb (rounded down from 2 kb), the difference between 0 kb and 2 kb may be padded. In an embodiment, the difference is padded with zeroes. The IO may now have a "start" offset at 0 kb and a length of 4 kb, the first 2 kb of which are padded (typically with zeroes).

At block 614, a check may be made to determine whether the IO size is a multiple of the block size. This may be substantially similar to the processes discussed above, and a data protection appliance, a deduplicated storage, or some other system may perform the check. If the IO size is not a multiple of the block size, the IO is determined to be unaligned and the alignment process continues.

At block 616, the IO is padded to increase the IO size to a multiple of the block size. Continuing with the example above, the IO may have a new start offset at 0 kb and a total length of 4 kb. The end of the TO, following the data spanning from 2 kb to 4 kb, may be padded to bring the IO size up to 8 kb, which is a multiple of the block size. As with the offset size, the IO may be padded to any multiple of the block size (e.g. 8 kb, 16 kb, 24 kb, etc).

In an embodiment, once the IO is properly aligned with the padding (either before or after the actual data) it may be written to the deduplicated storage. In an embodiment, the padded data is written to a data journal and the offsets and other data may be written to a metadata journal. The data may not, however, be ready to use for recovery. This is because the data may not accurately represent the state of the storage system. Since the IO was padded, the journaled IO may only contain a subset of the data actually stored in the storage system. In our example, the journal will indicate offset 0 kb comprises 2 kb of padding, followed by 2 kb of data, followed by another 4 kb of padding. In reality, offset 0 kb likely contains 8 kb of data, only two of which were communicated in the IO. In some embodiments, the metadata journal may note which data is contained in the journal file. Should a synthesis be necessary, the metadata may be used to read the actual data (e.g. the 2 kb of data) from the data journal.

Block 618 may resolve the data discrepancy. At block 618, a read request is sent to the storage device. In an embodiment, the read request may be a request for data within the padded portions of the IO. In our example, the read request may be for the data between 0 kb and 2 kb, and between 4 kb and 8 kb. Additionally or alternatively, the read request may be for the entire 8 kb from 0 kb to 8 kb, including the 2 kb that was received in the original IO. Once the data is received in response to the request, the data journal entry may be updated in include the complete data rather than just the padded data, or a new journal entry containing the fully aligned data may be created. Additionally or alternatively, nothing may be written to the data journal until the full data is received.

To further illustrate the process, including the rereading the unaligned IOs, consider a received IO with an offset of 20 kb and a length of 5 kb. Rounding this IO up and down, we end up with an aligned IO spanning 16 kb, which will be stored in two 8 kb blocks. The first block will include data from offset 16 kb (rounded down from 20 kb) with a length of 8 kb. The first 4 kb will be padded and the final 4 kb will contain data. The second block will include data from offset 24 kb with a length of 8 kb. The first 1 kb will be data, and the remaining 7 kb will be padding. The system may then send read requests for the data at offset 16 kb, length 16 kb, and update the journal entries accordingly.

As a final example, consider a large IO to offset 6 kb with a length of 24 kb. Assuming 8 kb blocks, the IO will be rounded down to 0 kb and the length will be rounded up to 32 kb. The data associated with the IO will therefore span four 8 kb blocks. Note that after padding, however, only the two blocks on the end (i.e. offset 0 and offset 32) contain padded data. The inner blocks do not include any padded data, and therefore nothing needs to be re-read from the storage system. As a result, the read request(s) may only be for offset 0, length 8, and offset 32, length 8.

Turning now to FIG. 7, a synchronization process is discussed. Since the system may be a continuous data protection system, new IOs may continue to arrive throughout the alignment process. If an IO makes a write to a location that is currently being read for alignment purposes, the data on the backup system be become desynchronized. FIG. 7 addresses this concern.

At block 700, an IO comprising a write to a storage device is received. This may be substantially similar to block 600, discussed above.

At block 702, a determination is made whether the IO is aligned with a storage block on a backup system. Again, this process may be substantially similar to that discussed above.

At block 704, any IO that is not aligned may be tracked. For example, the IO may be tracked in the memory of the data protection system. The alignment process may continue for tracked IO's, but following the alignment the read request may not be immediately transmitted to the storage system.

At block 706, the data protection appliance may wait for a host to flush any open IOs to the storage device. For example, the host may be similar to host 104, and the IOs may be managed by source side protection agent 144. The data protection appliance may wait until all IOs are flushed from the source side protection agent to the storage. This wait may ensure that any data read from the storage is up-to-date.

At block 708, the read requests may be sent to the storage device. These read requests may be for aligned IO's, and may be substantially similar to those discussed above.

At block 710, a second IO may be received from the host. For example, the IO may be received at that data protection appliance from the source side protection agent. This IO may be received since IOs are continuously streamed to the data protection appliance, as discussed above. In some embodiments, the second IO may be received before the read request is sent at block 708.

At 712, a determination is made whether the second IO comprises a write to data requested by the read request. In other words, a check is made to see if this write was for data related to an IO the system is trying to align (i.e. an IO being tracked). If it is, the tracked IO is dirty. If a read request has been sent, the response may be disregarded.

Finally, at block 714 the dirty IO may restart the alignment process. In an embodiment, the alignment process is started from the beginning (e.g. from block 602). In some embodiments, the dirty IO may simply be dropped, and no further alignment and/or journaling may occur.

The processes discussed herein enable IO alignment for continuous data protection on deduplicated storage. They may decrease space consumption and increase efficiency both during the journaling process, and during snapshot synthesis. Specifically, they may decrease the amount of data movement during synthesis be enabling more pointer manipulation.

General Purpose Computer System

FIG. 16 depicts a computer system which may be used to implement different embodiments discussed herein. General purpose computer 1600 may include processor 1602, memory 1604, and system IO controller 1606, all of which may be in communication over system bus 1608. In an embodiment, processor 1602 may be a central processing unit ("CPU") or accelerated processing unit ("APU"). Some embodiments may comprise multiple processors, or a processor with multiple cores. Processor 1602 and memory 1604 may together execute a computer process, such as the processes described herein.

System IO controller 1606 may be in communication with display 1610, input device 1612, non-transitory computer readable storage medium 1614, and/or network 1616. Display 1610 may be any computer display, such as a monitor, a smart phone screen, or wearable electronics and/or it may be an input device such as a touch screen. Input device 1612 may be a keyboard, mouse, track-pad, camera, microphone, or the like, and storage medium 1614 may comprise a hard drive, flash drive, solid state drive, magnetic tape, magnetic disk, optical disk, or any other computer readable and/or writable medium. Storage device 1614 may also reside inside general purpose computer 1600, rather than outside as shown in FIG. 1.

Network 1616 may be any computer network, such as a local area network ("LAN"), wide area network ("WAN") such as the internet, a corporate intranet, a metropolitan area network ("MAN"), a storage area network ("SAN"), a cellular network, a personal area network (PAN), or any combination thereof. Further, network 1616 may be either wired or wireless or any combination thereof, and may provide input to or receive output from IO controller 1606. In an embodiment, network 1616 may be in communication with one or more network connected devices 1618, such as another general purpose computer, smart phone, PDA, storage device, tablet computer, or any other device capable of connecting to a network.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for aligning IOs prior to transmission to or after reception at a data protection appliance, comprising:
   receiving an IO at the data protection appliance, the IO comprising an IO offset and having an IO size, wherein the IO comprises one of a plurality of streamed IOs used to synthesize snapshot backups in a deduplicated backup storage system that synthesizes an initial snapshot backup using a metadata journal and a data journal and copies pointers to data rather than entire data blocks;
   determining whether the IO is byte aligned with a storage block having a defined block size on the deduplicated backup storage system by having an IO offset that is a multiple of the block size and an IO size that is the multiple of the block size;
   aligning the IO at the data protection appliance to create an aligned IO when the IO is not aligned with the storage block when prior to the transmission by identifying a start offset lower than the IO offset, wherein the start offset is a multiple of the block size, changing the IO offset to the start offset, and aligning the IO by increasing the IO size to a multiple of the block size; or when after the reception by rounding the IO offset down to the start offset, padding a difference between the start offset and the IO offset and padding the IO to a new size that is the multiple of the block size;
   transmitting the aligned IO to a backup storage system, wherein creating the IO comprises writing of snapshot backup data from a computer to the data protection appliance during a continuous data replication operation having periodic snapshot backups;
   tracking any IO that is not aligned in a memory of the deduplicated backup storage system to determine if a non-aligned IO is writing to a location that is currently being read thereby creating a desynchronization;
   waiting for the computer to flush any open IOs to the deduplicated backup storage system to ensure that any data read from the deduplicated backup storage system is up-to-date to enable the continuous data replication operation;
   defining the metadata journal as a logical unit partitioned into segments of a defined size and that stores DO and UNDO metadata streams and pointers thereto for the backup data written to the data protection appliance wherein the DO metadata stream includes the offset for the aligned TO, and wherein the UNDO metadata includes an offset to corresponding old data for the backup data;
   storing the IO offset in the metadata journal on the backup storage system, wherein the offset is used to properly align the IO with blocks on the data protection appliance to synthesize the initial snapshot backup of the continuous data replication operation in a first synthesis operation that creates a first pointer to the snapshot backup data for the aligned IO and requests a block size from the backup storage system; and
   storing subsequent IO offsets to the metadata journals for aligning subsequent IOs for synthesizing subsequent snapshot backup operations that create additional pointers to respective snapshot backup data for the aligned subsequent IOs.

2. The method of claim 1, wherein the storage system is a back-end storage system, and wherein an undo write transaction reads the old data from the UNDO metadata stream using the offset to the corresponding old data.

3. A computer program product for aligning IOs prior to transmission to or after reception at a data protection appliance, the computer program product comprising a non-transitory computer readable medium encoded with computer executable program, the code enabling:
   receiving an IO at the data protection appliance, the IO comprising an IO offset, wherein the IO comprises one of a plurality of streamed IOs used to synthesize snapshot backups in a deduplicated backup storage system that synthesizes an initial snapshot backup using a metadata journal and a data journal and copies pointers to data rather than entire data blocks;
   determining whether the IO is byte aligned with a storage block having a defined block size on the deduplicated backup storage system by having an IO offset that is a multiple of the block size and an IO size that is the multiple of the block size;
   aligning the IO at the data protection appliance to create an aligned IO when the IO is not aligned with the storage block when prior to the transmission by identifying a start offset lower than the IO offset, wherein the start offset is a multiple of the block size, changing the IO offset to the start offset, and aligning the IO by increasing the IO size to a multiple of the block size; or when after the reception by rounding the IO offset down to the start offset, padding a difference between the start offset and the IO offset and padding the IO to a new size that is the multiple of the block size;

transmitting the aligned IO to a backup storage system, wherein creating the IO comprises writing of snapshot backup data from a computer to the data protection appliance during a continuous data replication operation having periodic snapshot backups;

tracking any IO that is not aligned in a memory of the deduplicated backup storage system to determine if a non-aligned IO is writing to a location that is currently being read thereby creating a desynchronization;

waiting for the computer to flush any open IOs to the deduplicated backup storage system to ensure that any data read from the deduplicated backup storage system is up-to-date to enable the continuous data replication operation;

defining the metadata journal as a logical unit partitioned into segments of a defined size and that stores DO and UNDO metadata streams and pointers thereto for the backup data written to the data protection appliance wherein the DO metadata stream includes the offset for the aligned TO, and wherein the UNDO metadata includes an offset to corresponding old data for the backup data;

storing the IO offset in the metadata journal on the backup storage system, wherein the offset is used to properly align the IO with blocks on the data protection appliance to synthesize the initial snapshot backup operation of the continuous data replication operation in a first synthesis operation that creates a first pointer to the snapshot backup data for the aligned IO and requests a block size from the backup storage system; and storing subsequent IO offsets to the metadata journal for aligning subsequent IOs for synthesizing subsequent snapshot backup operations that create additional pointers to respective snapshot backup data for the aligned subsequent IOs.

4. The computer program product of claim 3, wherein the storage system is a back-end storage system, and wherein an undo write transaction reads the old data from the UNDO metadata stream using the offset to the corresponding old data.

5. A system for aligning IOs prior to transmission to or after reception at a data protection appliance, comprising a memory and a processor, the processor configured to execute instructions comprising:

receiving an IO at the data protection appliance, the IO comprising an IO offset and having an IO size, wherein the IO comprises one of a plurality of streamed IOs used to synthesize snapshot backups in a deduplicated backup storage system that synthesizes an initial snapshot backup using a metadata journal and a data journal and copies pointers to data rather than entire data blocks;

determining whether the IO is byte aligned with a storage block having a defined block size on the deduplicated backup storage system by having an IO offset that is a multiple of the block size and an IO size that is the multiple of the block size;

aligning the IO at the data protection appliance to create an aligned IO when the IO is not aligned with the storage block when prior to the transmission by identifying a start offset lower than the IO offset, wherein the start offset is a multiple of the block size, changing the IO offset to the start offset, and aligning the IO by increasing the IO size to a multiple of the block size; or when after the reception by rounding the IO offset down to the start offset, padding a difference between the start offset and the IO offset and padding the IO to a new size that is the multiple of the block size;

transmitting the aligned IO to the deduplicated backup storage system, wherein creating the IO comprises writing of snapshot backup data from a computer to the data protection appliance during a continuous data replication operation having periodic snapshot backups;

tracking any IO that is not aligned in a memory of the deduplicated backup storage system to determine if a non-aligned IO is writing to a location that is currently being read thereby creating a desynchronization;

waiting for the computer to flush any open IOs to the deduplicated backup storage system to ensure that any data read from the deduplicated backup storage system is up-to-date to enable the continuous data replication operation;

defining the metadata journal as a logical unit partitioned into segments of a defined size and that stores DO and UNDO metadata streams and pointers thereto for the backup data written to the data protection appliance wherein the DO metadata stream includes the offset for the aligned TO, and wherein the UNDO metadata includes an offset to corresponding old data for the backup data;

storing the IO offset in the metadata journal on the backup storage system, wherein the offset is used to properly align the IO with blocks on the data protection appliance to synthesize the initial snapshot backup of the continuous data replication operation in a first synthesis operation that creates a first pointer to the snapshot backup data for the aligned IO and requests a block size from the backup storage system; and storing subsequent IO offsets to the metadata journal for aligning subsequent IOs for synthesizing subsequent snapshot backup operations that create additional pointers to respective snapshot backup data for the aligned subsequent IOs.

6. The system of claim 5, wherein the storage system is a back-end storage system, and wherein an undo write transaction reads the old data from the UNDO metadata stream using the offset to the corresponding old data.

* * * * *